Patented Aug. 27, 1929.

1,725,805

UNITED STATES PATENT OFFICE.

MAX LANDECKER, OF BARMEN, GERMANY, ASSIGNOR, BY MESNE ASSIGNMENTS, TO AMERICAN NUPLAX CORPORATION, OF NEW YORK, N. Y., A CORPORATION OF DELAWARE.

ADHESIVE AND PLASTIC MASS AND METHOD OF PREPARING THE SAME.

No Drawing. Application filed May 29, 1926, Serial No. 112,734, and in Germany April 8, 1926.

This invention relates to the preparation of adhesive and plastic masses and relates more particularly to the preparation of such materials from casein and urea.

It is an object of the present invention to prepare neutral casein glues.

It is a further object of this invention to prepare neutral casein glues which contain a hardening agent.

A still further object is to provide such glues in the form of a powder which may be sold in commerce and is ready for use merely upon the addition of water.

It has long been known that casein glues are extremely adhesive, but it has been impossible to use them in place of the animal and vegetable glues such as bone glue and gum arabic, for the reason it has heretofore been necessary to dissolve the casein in alkalies to make the casein glue, and these alkalies tend to yellow and eventually destroy fine paper and other objects to be joined. Furthermore, many of these prior art casein glues are subject to the destructive action of bacteria when in solution, and the joints made are comparatively easily soluble in water. In order to increase the insolubility of such glues, cumbersome and unpleasant operations with formaldehyde are necessary, and in many cases, such hardening treatment is impossible or reaches only the edges of the joint.

I have discovered that a clear, neutral casein solution may be readily produced by dissolving casein in an aqueous solution of urea, or by stirring a mixture of casein and urea in water. Furthermore, either rennet casein or acid casein may be used in the preparation of this solution, whereas only acid casein may be used in the preparation of the ordinary alkali casein glues. The casein completely dissolves in the cold aqueous solution of urea in a short time, and only relatively small quantities of casein are required to make a fluid of substantial adhesiveness as compared with the quantity of casein which must be dissolved in an alkali solution to form an equally adhesive mixture. To prepare a casein glue of this character, 7 grams of casein may be stirred into 100 cu. cm. of an urea solution, consisting of one part by weight of urea and one part by weight of water. This produces a slimy, very adhesive mixture. As an alternative method of preparation, 100 grams of urea and 20 grams of casein may be ground for two hours in a mixing mill. The resulting powder may be used to form either a paste, a jelly or sirup-like fluid, depending upon the quantity of water added. For example, 10 grams of this powder mixed with 20 cu. cm. of water yields a paste, while the same quantity of powder with 40 cu. cm. of water yields a strongly adhesive sirup-like liquid.

An adhesive according to my invention is preferably produced by intimately mixing powdered urea and powdered casein in the proper proportions, and stirring the mixture in water, whereupon a high grade casein glue is immediately provided. The dry casein and urea powder is neither hygroscopic nor subject to decomposition by the action of bacteria. An important commercial advantage of my invention is that the adhesive may be sold as a dry powder, so that it is in a form ready for use upon merely adding water. This is not true of the alkali casein glues made from the ordinary commercial alkalies such as caustic soda and caustic potash. To prepare these glues, the casein must be added to the alkali solution immediately before use, and the proportions of casein and alkali must be determined by the user.

The solution of casein and urea prepared as above described may be cooked or boiled without any coagulation of the casein taking place and also without any diminution of adhesiveness of the product. Upon cooling, the casein solution forms a uniform white mass having the appearance of a thick starch paste which may be readily dissolved in water to form a thin glue, or used directly as a paste.

If coloring materials such as ochre, cinnabar, coloring lacquer, etc., or filling materials such as chalk or the like are added to the powdered mixture of casein and urea, a ready-to-use paint or cement is obtained upon the addition of water. Thus a white paint may be obtained by intimately mixing 100 grams of urea, 10 grams of casein, 40 grams of lithopone and 120 cu. cm. of water. To produce a white cement the same mixture may be employed, substituting 70 grams of lithopone in place of the 40 grams used in the preceding formula.

In order to decrease the water solubility of the glued joint, it has heretofore been necessary, as stated above, to harden the casein glue with formaldehyde while or after making the joint. According to my invention however, formaldehyde in any form may be added directly to the casein urea solution. No coagulation takes place on this addition, but the fluid becomes thicker and presents an increased adhesiveness while still retaining its water solubility. After the joint has been glued and permitted to dry, the formaldehyde already present in the glue serves to harden it and increase the resistance of the joint to water. The advantages of this manner of using formaldehyde are obvious, inasmuch as the formaldehyde is distributed over the entire surface of the glued joint, and effects its hardening action quickly, whereas, according to the old method of treating the finished joint with formaldehyde only the edges of the joint could be reached.

Instead of adding formalin or formaldehyde in some other form to the casein urea solution, a solid polymer of formaldehyde, such as paraformaldehyde, may be added to the powdered mixture of casein and urea referred to above. This has the advantage that the powder as sold will contain the hardening reagent in the necessary quantity, thus further reducing the inconvenience to the user.

A further peculiar property of the casein urea solution is that an albuminous precipitate is obtained when an excess of water is added. For example, if a casein urea solution prepared as above described is poured into a large quantity of water or diluted therewith, an albuminous substance in the form of easily filtered flakes quickly precipitates. It will be apparent from this that joints made with casein urea solution according to my invention will have a much larger water resistance than those made with the soluble alkali casein glues heretofore in common use, for the reason that the latter readily dissolve in water even when present in excess.

A further use of this casein urea solution is in the preparation of moulded plastic masses. If the casein urea solution be diluted as described above to such an extent that precipitation takes place, it is found that the easily filtered flakes of albuminous material thus obtained have, when dried, the property of forming a transparent artificial horn when moulded with heat and pressure, and furthermore, the pressure required is materially lower than that necessary with moulded objects heretofore made of casein.

In the claims the term "formaldehyde" is intended to include the polymers of formaldehyde.

I claim:

1. An adhesive mixture comprising casein, urea, formaldehyde and water.

2. As a new composition of matter, a powdered mixture adapted to form an adhesive upon the addition of water, and comprising casein, urea and formaldehyde.

3. The process of preparing a neutral casein solution, adapted for use, as an adhesive, which consists in dissolving urea in water, and then dissolving casein in the urea solution.

In testimony whereof, I have signed my name to this specification this 15th day of May, 1926.

MAX LANDECKER.